United States Patent Office 3,242,218
Patented Mar. 22, 1966

3,242,218
PROCESS FOR PREPARING FLUOROCARBON POLYETHERS
William T. Miller, Ithaca, N.Y., assignor to E. I. du Pont de Nemours and Company, Wilmington, Del., a corporation of Delaware
No Drawing. Filed Mar. 29, 1961, Ser. No. 99,037
3 Claims. (Cl. 260—615)

The present invention relates to polymers of perfluoro-olefin epoxides, and, more particularly, to perfluoro-olefin epoxide polymers of improved thermal stability.

The fluorocarbon polyethers made by the process of the present invention have the following structure:

$$X-CF_2-CF_2-O-[CF(X)-CF_2-O-]_nCF_2-X$$

where $n$ is a positive integer including zero and represents the number of $-CF(X)-CF_2-O-$ units in the molecule and where X is a member of the class consisting of fluorine and the perfluoromethyl radical.

The polyethers of the present invention are prepared from polyethers obtained by the polymerization of a perfloroolefin epoxide, such as hexafluoropropylene epoxide and tetrafluoroethylene epoxide, by hydrolysis of the resulting polymerization product and the simultaneous fluorination and decarboxylation of the hydrolyzed product.

Hexafloropropylene epoxide is obtained by the reaction of hexafluoropropylene with alkaline hydrogen peroxide. The polymerization of hexafluoropropylene epoxide may be carried out by the following procedure:

In a dry nitrogen atmosphere, a 500 ml. stainless steel cylinder is charged with 28.6 g. of "Darco" 12 x 20 activated carbon which had been dried for 12 hours at 400° C. in vacuo. The cylinder is cooled to liquid nitrogen temperatures and 400 g. of hexafluoropropylene epoxide is charged into the cylinder. The reaction mixture is allowed to come to room temperature, where it is maintained for approximately three days. The reaction mixture is then distilled through a column. Various fractions of the polymer having the general formula

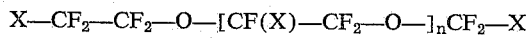

and differing in degree of polymerization are obtained. In a specific example, using the described procedure, the conversion to dimer ($n=0$) is about 12%, to trimer ($n=1$) about 5.1% to polymers boiling up to 285° C. at 0.12 mm. Hg pressure ($n=2$ to 35) about 50%, and to polymers boiling above 285° C. at 0.12 mm. Hg pressure ($n>35$) about 3.2%. Approximately 25% of unreacted hexafluoropropylene epoxide is recovered. The dimers and trimers are light solvents, the polymers having a degree of polymerization of $n=2$ to $>35$ may be classified as oils and the polymers having a degree of polymerization of $n>35$ as non-pourable oils, greases, and waxes.

Tetrafluoroethylene epoxide is prepared by subjecting a mixture of oxygen and tetrafluoroethylene to irradiation by utraviolet light, preferably in the presence of small quantities of bromine. Tetrafluoroethylene epoxide can be polymerized by the same methods employed in the polymerization of hexafluoropropylene epoxide. Similar products, i.e. dimers, trimers, oils, and solids are obtained. The polymer structure for tetrafluoroethylene epoxide polyether is

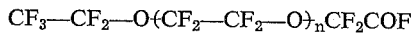

where $n+2$ indicates the degree of polymerization.

Although polymers obtained from the polymerization of hexafluoropropylene epoxide and tetrafluoroethylene epoxide have outstanding thermal stability, it was discovered that greater thermal and chemical stability could be achieved by replacing the acid fluoride group with a fluorine radical. The completely fluorinated polymers are markedly superior in resistance to both acids and bases which attack the acid fluoride group of the polymer, thereby causing the polymer chain to unzip. Surprisingly, it was also found that the replacement of the acid fluoride group with fluorine can be carried out by the direct fluorination and decarboxylation of the perfluoroolefin epoxide polymer as the carboxylic acid derived from the acid fluoride. This is surprising in view of the high molecular weight of the compounds involved as starting materials and the known high reactivity of fluorine which could readily have led to reaction at the ether bond or at the perfluoromethyl branches of the polymer.

The decarboxylation and fluorination is carried out by passing fluorine through a reaction mixture containing the acid of the perfluoroolefin epoxide polymer at a temperature of 50 to 300° C. and preferably at a temperature of 150 to 250° C. Where the perfluoroolefin epoxide polymer is liquid at the reaction temperatures, the fluorine can be passed directly through the liquid polymer. Otherwise, it is preferred to dissolve the perfluoroolefin epoxide polymer in a suitable inert solvent. Preferred solvents for this process comprise, in particular, completely fluorinated, saturated hydrocarbons such as perfluoroheptane, perfluorodimethylcyclobutane, perfluorocyclohexane, perfluorokerosenes, etc. The fluorine can be passed through the reaction mixture without modifications or can be diluted with inert gases such as nitrogen, helium, or argon.

The hydrolysis of the perfluoroorefin polyether, to obtain an acid end group, is carried out by contacting the polymer, either as such or in solution, in a perfluorinated saturated hydrocarbon, with water.

The preparation of the perfluoroolefin epoxide polyethers is further illustrated by the following examples:

EXAMPLE I

A solution of 38.8 g. of hexafluoropropylene epoxide polyether ($n=8$ to 11), B.P. 97 to 143° C. at 0.4 mm. Hg pressure, in 40 ml. of perfluorodimethylcyclobutane, was stirred with 25 ml. of water for 2.5 hours. The resulting two layers were separated. The aqueous layer was washed with two 15 ml. portions of perfluorodimethylcyclobutane and the combined fluorocarbon portions were azeotropically distilled to remove residual water. Distillation yielded 35.1 g. of hydrolyzed oil. The infraded spectrum of the product showed complete conversion of acid fluoride to carboxylic acid.

A mixture of fluorine and nitrogen was bubbled through 5.1 g. of the hydrolyzed polyether at flow rates of 85 ml./min. of nitrogen and 15 ml./min. of fluorine at 149 to 154° C. for 35 minutes. An infrared spectrum of the product indicated that about one-third of the carboxyl groups in the starting material had been removed. Fluorination was continued in the same manner at 184 to 187° C. for an additional 40 minutes. Infrared analysis of the resulting product showed substantially complete removal of carboxylic acid groups. The structure of the polyether was found to be

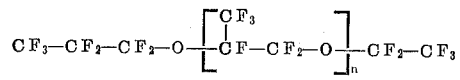

where $n$ is from 8 to 11.

EXAMPLE II

The procedure of Example I was substantially repeated employing a hexafluoropropylene epoxide polyether having a boiling point of greater than 285° C. at 0.12 mm. Hg pressure ($n>35$). The fluorination and decarboxylation was carried out using 9.6 g. of the polymer. Fluorine was passed through the polymer at rates of 70 ml./min. of nitrogen and 25 ml./min. of fluorine for 50 minutes at 185 to 192° C. to yield a quantitative amount of decarboxylated, fluorinated product as confirmed by infrared analysis.

EXAMPLE III

A mixture of fluorine and nitrogen, at the rate of 30 ml./min. and 65 ml./min. respectively, was continuously bubbled through 10.1 g. of the acid obtained on hydrolysis of the trimer of hexafluoropropylene epoxide, perfluoro-2,5-dimethyl-3,6-dioxanonanoic acid at 185 to 190° C. for a period of one hour. The off gas was passed through an ice trap in which 2 g. of poduct was collected. To the reaction mixture was then added 4.6 g. of additional starting material and the fluorination procedure was repeated. An additional 6 g. of product was recovered from the ice trap. Distillation of product resulted in 7 g. of a colorless liquid boiling between 70° and 80° C. Infrared and nuclear magnetic resonance indicated that this liquid was 1-(pentafluoroethoxy)-2-(heptafluoropropoxy)hexafluoropropane.

EXAMPLE IV

A mixture of nitrogen and fluorine is passed at the rate of 65 ml./min. and 30 ml./min into 15 g. of the acid obtained on hydrolyzing a poly(tetrafluoroethylene epoxide) having a boiling point of 130° to 200° C. at 0.3 mm. Hg pressure and an average molecular weight of 1000, said acid being maintained at a temperature of 185 to 190° C. for a period of two hours. The off gases are passed through an ice trap in which the product is collected. A completely fluorinated tetrafluoroethylene epoxide polyether having the formula

where $n+2$ is the degree of polymerization is obtained.

The improved stability of perfluoroolefin epoxide polyethers of the present invention is illustrated in the following table. The results were obtained by heating samples of hexafluoropropylene epoxide polyether having acid fluoride end groups and samples of hexafluoropropylene epoxide polyether fluorinated in accordance with the procedure described for 24 hours in stainless steel containers under an air atmosphere at the temperature indicated. A strip of copper metal was submerged under the oil during the heating period.

Table I

| | Acid Fluoride Polyether | Fluorine Capped Polyether | |
|---|---|---|---|
| Temp., °F | 500 | 500 | 600 |
| Appearance | (1) | (2) | (2) |
| Viscosity change: | | | |
| 210° F., percent | −31 | +2.4 | +1.0 |
| 100° F., percent | −45 | +3.3 | +1.0 |
| Weight Loss in g./ml | 0.11 | 0.02 | 0.02 |
| Weight Loss of copper strip, mg./cm.² | 1.4 | 0.05 | 0.10 |

[1] Cloudy, colorless.
[2] Clear, colorless.

The foregoing examples have illustrated the formation of improved polyethers by the process of the present invention. Various modifications of the procedures employed will be apparent and it is not intended to limit the scope of the invention to the examples. The perfluoroolefin epoxide polymers of the present invention find utility as high temperature lubricants and as lubricants in corrosive environments. The lower molecular weight polyethers are outstanding solvents and heat transfer media. Superior electrical properties of the polyether make these compounds extremely useful as dielectric oils.

I claim:
1. The process of preparing perfluoroolefin epoxide polyethers having fluorocarbon end groups which comprises heating a perfluorinated acid having the general formula

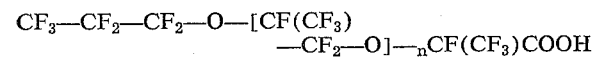

wherein $n$ is a positive integer from 0 to 35 inclusive, with fluorine at a temperature of 50 to 300° C., and recovering a perfluoroolefin epoxide polymer having the formula

2. The process as set forth in claim 1 wherein the perfluorinated polyether acid is perfluoro-2,5-dimethyl-3,6-dioxanonanoic acid.

3. The process of claim 1 wherein the perfluorinated polyether acid contains from 2 to 35

$$-CF(CF_3)-CF_2-O-$$

groups in the molecule.

References Cited by the Examiner
UNITED STATES PATENTS 2,500,388   3/1950   Simons _____ 260—615 X

OTHER REFERENCES

Lovelace et al.: Aliphatic Fluoride Compounds (1958), pages 40–42.

LEON ZITVER, *Primary Examiner.*

CHARLES B. PARKER, *Examiner.*